United States Patent [19]

Shinoda

[11] Patent Number: 5,956,676
[45] Date of Patent: Sep. 21, 1999

[54] PATTERN ADAPTING APPARATUS USING MINIMUM DESCRIPTION LENGTH CRITERION IN PATTERN RECOGNITION PROCESSING AND SPEECH RECOGNITION SYSTEM

[75] Inventor: Koichi Shinoda, Tokyo, Japan

[73] Assignee: NEC Corporation, Tokyo, Japan

[21] Appl. No.: 08/703,911

[22] Filed: Aug. 27, 1996

[30] Foreign Application Priority Data

Aug. 30, 1995 [JP] Japan .................................. 7-221740

[51] Int. Cl.⁶ .............................. G10L 5/04; G10L 5/06
[52] U.S. Cl. ......................... 704/244; 704/256; 704/252
[58] Field of Search .................................. 704/243, 255, 704/256, 257, 244, 252

[56] References Cited

U.S. PATENT DOCUMENTS

| | | | |
|---|---|---|---|
| 4,783,802 | 11/1988 | Takebayashi et al. | 381/41 |
| 5,129,002 | 7/1992 | Tsuboka | 381/43 |
| 5,222,146 | 6/1993 | Bahl et al. | 381/41 |
| 5,289,562 | 2/1994 | Mizuta et al. | 395/2 |
| 5,450,523 | 9/1995 | Zhao | 395/2.52 |
| 5,490,223 | 2/1996 | Nishimura et al. | 382/159 |
| 5,579,436 | 11/1996 | Chou et al. | 704/244 |
| 5,608,840 | 3/1997 | Tsuboka | 395/2.45 |
| 5,608,841 | 3/1997 | Tsuboka | 395/2.65 |
| 5,617,486 | 4/1997 | Chow et al. | 382/181 |
| 5,638,489 | 6/1997 | Tsuboka | 395/2.65 |

FOREIGN PATENT DOCUMENTS 6-348292  12/1994  Japan .
7-114394  5/1995  Japan .

OTHER PUBLICATIONS

Shinoda et al., "Speaker Adaptation with Autonomous Model Complexity Control By MDL Principles", IEEE ICASSP96, vol. 2, pp. 717–720 (1996).

Nakagawa, "Voice Recognition by Stochastic Model", IEICE, 1998, pp. 40–46, 55–60, 69–74.

Han et al, "Mathematical Principle of Information and Coding", 1994, pp. 211–265.

*Primary Examiner*—David R. Hudspeth
*Assistant Examiner*—M. David Sofocleous
*Attorney, Agent, or Firm*—Foley & Lardner

[57] ABSTRACT

A pattern adapting apparatus including an input pattern forming unit, a tree structure standard pattern storing unit for storing a tree structure standard pattern including a tree structure indicative of inclusive relationships among categories and a parameter set at each node of the tree structure, a pattern matching unit for matching categories of the tree structure standard pattern with input samples of an input pattern, a tree structure standard pattern modifying unit for modifying a tree structure standard pattern based on the results of pattern matching, a node set selecting unit for calculating a description length with respect to a plurality of node sets in a tree structure pattern to select an appropriate node set, a modified standard pattern forming unit for forming a modified standard pattern by using a parameter set of a selected node set, and a standard pattern for recognition storing unit for storing a modified standard pattern.

19 Claims, 3 Drawing Sheets

PATTERN ADAPTING APPARATUS USING MINIMUM DESCRIPTION LENGTH CRITERION IN PATTERN RECOGNITION PROCESSING AND SPEECH RECOGNITION SYSTEM

BACKGROUND OF THE INVENTION

1. Field of the Invention

The present invention relates to a pattern adapting apparatus for conducting pattern adaptation processing in pattern recognition processing and, more particularly, to a pattern adapting apparatus which performs adaptation to a speaker in a voice recognition system using standard patterns and in a voice recognition system using a mixed continuous distribution model type HMM.

2. Description of the Related Art

In recent years, studies of mechanical voice pattern recognition have been conducted to propose various techniques. Among them, representative techniques widely employed are a method called DP (dynamic programming) matching and a method using Hidden Markov Model (HMM). As voice recognition systems using such voice recognition methods as the DP matching and HMM, speaker-independent voice recognition systems have been enthusiastically studied and developed which aim at recognizing anybody's voice.

Figure 3:
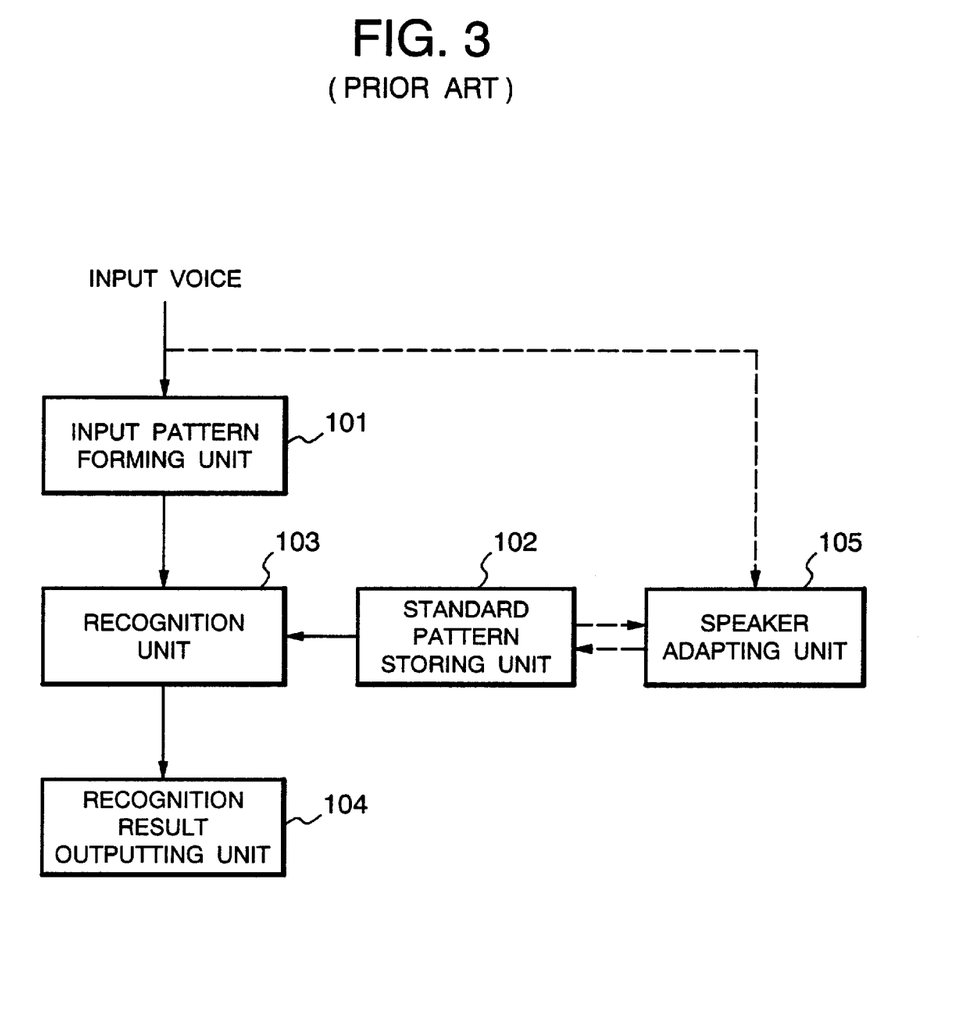
FIG. 3 is a block diagram showing a structure of a conventional voice recognition system.

With reference to FIG. 3, a voice recognition system will be described in the following with respect to a voice recognition method using HMM.

Voice of a speaker is first input to an input pattern forming unit 101 and subjected to such processing as AD conversion and voice analysis there. Then, the processed voice is converted into a time series of feature vectors on a basis of a unit of a predetermined time length called a frame.

The time series of the feature vectors is here referred to as an input pattern. Ordinary frame length ranges from 10 ms to 100 ms. Feature vectors are extraction of the quantity of features of voice spectra, which are in general of 10 to 100 dimensions.

A standard pattern storing unit 102 stores HMM. HMM is one of the models of voice information sources, whose parameters can be learned by using voice of a speaker. HMM will be more detailed when a recognizing unit 103 is described. HMM is in general prepared for each recognition unit. Here, a phoneme is taken as an example of a recognition unit. Speaker-independent voice recognition systems employ speaker-independent HMM learned in advance using voices of numbers of speakers as an HMM of the standard pattern storing unit 102.

It is assumed, for example, that 1,000 words are recognition targets. In other words, one right word is to be obtained among 1,000 candidate recognition targets. When recognizing a word, HMM of each phoneme is linked with each other to form HMM of a candidate recognition target word. With 1,000 words to be recognized, word HMM of 1,000 words are formed.

A recognizing unit 103 conducts recognition of an input pattern by using word HMM. HMM is a model of voice information sources, which adopts a statistical idea into description of standard patterns in order to cope with variations in voice patterns. Detailed description of HMM is found in the literature, "Voice Recognition by Stochastic Model" (Seiichi Nakagawa, Institute of Electronics, Information and Communication Engineers of Japan (IEICE), 1988), pp. 40–46, 55–60, 69–74 (hereinafter referred to as Literature 1).

HMM of each phoneme is made up of 1 to 10 states and their state transitions in-between. In general, a starting state and an ending state are defined. At every unit time, symbols are output at each state to cause state transition. Voice of each phoneme is represented as a time series of symbols output from HMM during the state transition from the starting state to the ending state. For each state, a symbol occurrence probability is defined and for each transition between the respective states, a transition probability is defined. Transition probability parameters represent variations of voice patterns in time output probability parameters are those regarding symbol occurrence probabilities at each state and representing variations of voice patterns in tone of voice. With a probability of a starting state fixed to a certain value, by multiplying occurrence probability and transition probability at each state transition, a probability of occurrence of a sound generated from the model can be obtained. Conversely, when a sound is observed, assuming the sound is generated from a certain HMM, its occurrence probability can be calculated. In voice recognition by HMM, HMM is prepared for each candidate recognition target, and when a sound is applied, a sound probability is obtained in each HMM, an HMM in which the probability is the highest is determined as a generation source and a candidate recognition target corresponding to the HMM is taken as a recognition result.

Out of discrete probability distribution expression and continuous probability distribution expression as output probability parameters, continuous probability distribution expression is taken here as an example. In the continuous probability distribution expression, mixed continuous distribution, that is, distribution obtained by adding a plurality of Gaussian distributions with weights, is used. Such parameters as output probability parameters, transition probability parameters and weights of a plurality of Gaussian distributions are learned in advance by the algorithm called Baum-Welch Algorithm, which provides a learning voice corresponding to a model. The Baum-Welch Algorithm is detailed in the Literature I. In the following example, the output probability is expressed by a mixed continuous probability distribution.

Processing to be conducted at the time of word recognition will be explained by the following formula. An input pattern X expressed as a time series of feature vectors is represented as:

$$X = x_1, x_2, \ldots, x_t, \ldots, x_T \tag{1}$$

Here, T represents the total number of frames of an input pattern. Candidate recognition target words are denoted as $W_1, W_2, \ldots, W_N$. N represents the number of candidate recognition target words. Matching between a word HMM for each word $W_n$ and an input pattern X is carried out using the following procedure. In the following, suffix n will be omitted unless it is necessary.

First, with respect to a word HMM, transition probability from a state j to a state i is represented as $a_{ji}$, mixed weight of an output probability distribution as $\lambda_{im}$, a mean vector of each element Gaussian distribution (referred to as a frame distribution) as $\mu_{im}$ and covariance matrix as $\Sigma_{im}$. Here, t represents an input time, i and j represent a state of HMM and m represents a mixed element number. Then, the following recurrence formulas regarding forward probability $\alpha(i,t)$ will be operated.

$$\alpha(i, o) = \pi_i, i=1, \ldots, I; t=1, \ldots, T \tag{2}$$

$$\alpha(i, O) = \sum_j \alpha(j, t-1) a_{ji} b_i(x_t) \quad (3)$$

$$i = 1, \cdots, I; t = 1, \cdots, T$$

Here, $\pi_i$ represents a probability of the initial state being i and $b_i(x)$ and $N(x;\mu_{im}, \Sigma_{im})$ will be defined by the following expressions.

$$b_i(x) = \sum_m \lambda_{im} N(x; \mu_{im}, \Sigma_{im}) \quad (4)$$

$$N(x;\mu_{im}, \Sigma_{im}) = (2\pi)^{-n/2} |\Sigma_{im}|^{-1/2} \exp(-(\mu_{im}-x)\Sigma^{-1}(\mu_{im}-x)/2) \quad (5)$$

Likelihood of an input pattern for the word $W_n$, is obtained by the following expression.

$$P^n(X) = \alpha(I, T) \quad (6)$$

I represents a final state. This processing will be executed for each word model. Recognition resultant word $W_{\hat{n}}$ for the input pattern X will be given by the following expression.

$$\hat{n} = \mathrm{argmax}_n P^n(X) \quad (7)$$

Obtained recognition resultant word is sent to a recognition result outputting unit 104.

The recognition result outputting unit 104 executes such processing as outputting a recognition result on a screen and sending a control instruction corresponding to a recognition result to other units.

Unlike a speaker-dependent system targeting a specific user, a speaker-independent recognition system has an advantage that it is unnecessary for a user to register his/her speaking in advance. However, the system has a drawback that for almost every speaker, recognition performance is lower than that of a speaker-dependent system. Another shortcoming is that there exists a speaker (peculiar speaker) for which recognition performance is especially low. In order to solve these problems, studies have been conducted are under way for applying speaker adaptation techniques that have been conventionally used in speaker-dependent systems also to speaker-independent systems.

Speaker adaptation is a system for adapting a recognition system to a new user (unknown speaker) by using a less amount of data for adaptation than that for learning. In the speaker adaptation, a standard pattern of the standard pattern storing unit is modified to improve the recognition performance with respect to unknown speakers (indicated by the dotted line in FIG. 31. Speaker adaptation system is explained in detail in the literature "Speaker Adaptation Technique in Voice Recognition" (Sadaki Furui, The Institute of Television Engineers of Japan, 1989, vol. 43, No. 9, pp. 929–934).

Speaker adaptation is roughly categorized into two methods. One is speaker adaptation with teacher and the other is speaker adaptation without teacher. Here, teacher denotes a phonemic notation sequence indicative of the contents of applied sounds. Adaptation with teacher is an adaptation method that is to be employed when a phonemic notation sequence for input sounds is known, and which needs to designate a vocabulary to be sounded to an unknown speaker in advance at the time of adaptation.

On the other hand, adaptation without teacher is an adaptation method that is to be employed when a phonemic notation sequence for input sounds is unknown, and which has no constraints on the contents of a sound to be applied by an unknown speaker. In other words, it is unnecessary to indicate the contents of sounds to an unknown speaker. It is therefore possible to conduct adaptation by using an applied voice whose recognition is under way, without having an unknown speaker notice it. In general, the adaptation without teacher has lower recognition performance after the execution of adaptation as compared with the adaptation with teacher. Adaptation with teacher is therefore more commonly used at present.

As described in the foregoing, speaker adaptation techniques have been adopting a system of converting an initial standard pattern into a standard pattern for each speaker. Parameters of a model for speaker adaptation for use in this standard pattern conversion have been conventionally constant regardless of the number of data.

Conventional speaker adaptation techniques therefore have drawbacks that in a model having a large number of parameters, estimation will be unstable with a small amount of data and that in a model having a small number of parameters, recognition performance fails to improve with a large amount of data.

SUMMARY OF THE INVENTION

A first object of the present invention is to provide, in a voice recognition system, a pattern adapting apparatus which implements high-performance speaker adaptation, irrespective of the amount of data, by changing the number of parameters of a speaker adaptation model according the amount of data when in modifying standard patterns for use in recognition processing corresponding to individual speakers.

A second object of the present invention, in addition to the above first object, is to provide a pattern adapting apparatus which enables degradation of estimation precision due to a lack of data to be suppressed to achieve excellent recognition performance by using a minimum description length criterion in the adaptation of standard patterns even when data for adaptation is small in amount.

A third object of the present invention, in addition to the above first and second objects, is to provide a pattern adapting apparatus which allows recognition performance to be further improved by estimating a sufficient number of free parameters meeting the amount of data when data for adaptation is sufficient.

According to the first aspect of the invention, there is a pattern adapting apparatus for adapting standard patterns made up of a plurality of categories to individual targets by the learning employing an input pattern as a set of input samples. The apparatus comprises an input pattern forming unit for forming an input pattern.

The apparatus also comprises a tree structure standard pattern storing unit for storing a tree structure standard pattern including a tree structure indicative of inclusive relationships among categories and a set of parameters at each node of the tree structure.

The apparatus further comprises a pattern matching unit for matching the categories of the tree structure standard pattern with the input samples of the input pattern.

The apparatus additionally comprises a tree structure standard pattern modifying unit for modifying the tree structure standard pattern based on the results of pattern matching by the pattern matching unit.

The apparatus also comprises a node set selecting unit for calculating a description length with respect to a plurality of node sets in the tree structure pattern to select an appropriate node set according to the calculated description length.

The apparatus further comprises a modified standard pattern forming unit for forming a modified standard pattern by using a parameter set of the node set selected by the node set selecting unit.

The apparatus additionally comprises a standard pattern for recognition storing unit for storing a modified standard pattern formed by the modified standard pattern forming unit.

In the preferred construction, a time series of frame vectors obtained by voice analysis is used as the input pattern.

In the preferred construction, a time series of frame vectors obtained by voice analysis is used as the input pattern, and a tree structure formed by using a Gaussian distribution at each state of a Hidden Markov Model whose output probability distribution is a mixed Gaussian distribution is used as the tree structure standard pattern.

According to the second aspect of the invention, there is a pattern adapting apparatus provided in a voice recognition system for performing pattern recognition processing of an input voice as an input sample to specify a speaker of the input voice.

The apparatus comprises a tree structure standard pattern storing unit for storing a tree structure standard pattern including a tree structure indicative of inclusive relationships among categories and a set of parameters at each node of the tree structure.

The apparatus also comprises a pattern matching unit for receiving an input pattern as a times series of frame vectors obtained by analyzing the input voice to match the categories of the tree structure standard pattern with an input sample of the input pattern.

The apparatus further comprises a standard pattern modifying unit for modifying the tree structure standard pattern based on the results of pattern matching by the pattern matching unit.

The apparatus additionally comprises a node set selecting unit for calculating a description length with respect to a plurality of node sets in the tree structure pattern to select an appropriate node set according to the calculated description length.

The apparatus also comprises a modified standard pattern forming unit for forming a modified standard pattern by using a parameter set of the node set selected by the node set selecting unit.

The apparatus further comprises a standard pattern for recognition storing unit for storing a modified standard pattern formed by the modified standard pattern forming unit.

In the preferred construction, a tree structure formed by using a Gaussian distribution at each state of a Hidden Markov Model whose output probability distribution is a mixed Gaussian distribution is used as the tree structure standard pattern, and the pattern matching unit performs pattern matching by using a mean vector of the output probability distribution as a parameter.

According to the third aspect of the invention, there is a voice recognition system for specifying a speaker of an input voice as an input sample by performing pattern recognition processing of the input voice. The system includes an input pattern forming unit for forming an input pattern as a time series of frame vectors obtained by analyzing an input voice, a standard pattern storing unit for storing a model of voice information source, a recognition unit for recognizing an input pattern based on the input pattern and the standard pattern storing unit to specify a speaker of the input voice, and a pattern adapting apparatus for modifying, for an individual speaker, the model of voice information source stored in the standard pattern storing unit. The pattern adapting apparatus comprises a tree structure standard pattern storing unit for storing a tree structure standard pattern including a tree structure indicative of inclusive relationships among categories and a set of parameters at each node of the tree structure.

The apparatus also comprises a pattern matching unit for receiving an input pattern as a times series of frame vectors obtained by analyzing the input voice to match the categories of the tree structure standard pattern with an input sample of the input pattern.

The apparatus further comprises a standard pattern modifying unit for modifying the tree structure standard pattern based on the results of pattern matching by the pattern matching unit.

The apparatus additionally comprises a node set selecting unit for calculating a description length with respect to a plurality of node sets in the tree structure pattern to select an appropriate node set according to the calculated description length.

The apparatus still further comprises a modified standard pattern forming unit for forming a modified standard pattern by using a parameter set of the node set selected by the node set selecting unit to store the modified standard pattern in the standard pattern storing unit in place of a model of voice information source prior to the modification.

In the preferred construction, the pattern adapting apparatus uses, as the tree structure standard pattern, a tree structure formed by using a Gaussian distribution at each state of a Hidden Markov Model whose output probability distribution is a mixed Gaussian distribution.

In another preferred construction, the pattern adapting apparatus uses, as the tree structure standard pattern, a tree structure formed by using a Gaussian distribution at each state of a Hidden Markov Model whose output probability distribution is a mixed Gaussian distribution, and the pattern matching unit of the pattern adapting apparatus performs pattern matching by using a mean vector of the output probability distribution as a parameter.

According to the fourth aspect of the invention, there is a pattern adapting apparatus for adapting standard patterns made up of a plurality of categories to individual targets by the learning employing an input pattern as a set of input samples. The apparatus comprises an input pattern forming unit for forming an input pattern.

The apparatus also comprises a candidate standard pattern storing unit for storing a plurality of standard patterns.

The apparatus further comprises a pattern matching unit for matching the categories of the standard pattern with the input samples of the input pattern.

The apparatus additionally comprises a standard pattern modifying unit for modifying the standard pattern based on the results of pattern matching by the pattern matching unit.

The apparatus also comprises a description length calculating unit for calculating a description length of each modified standard pattern corresponding to the input pattern.

The apparatus further comprises a modified standard pattern selecting unit for selecting a modified standard pattern according to a description length of the standard pattern calculated by the description length calculating unit.

The apparatus additionally comprises a standard pattern for recognition storing unit for storing a modified standard pattern formed by the modified standard pattern selecting unit.

Other objects, features and effects of the present invention will become apparent from the following detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
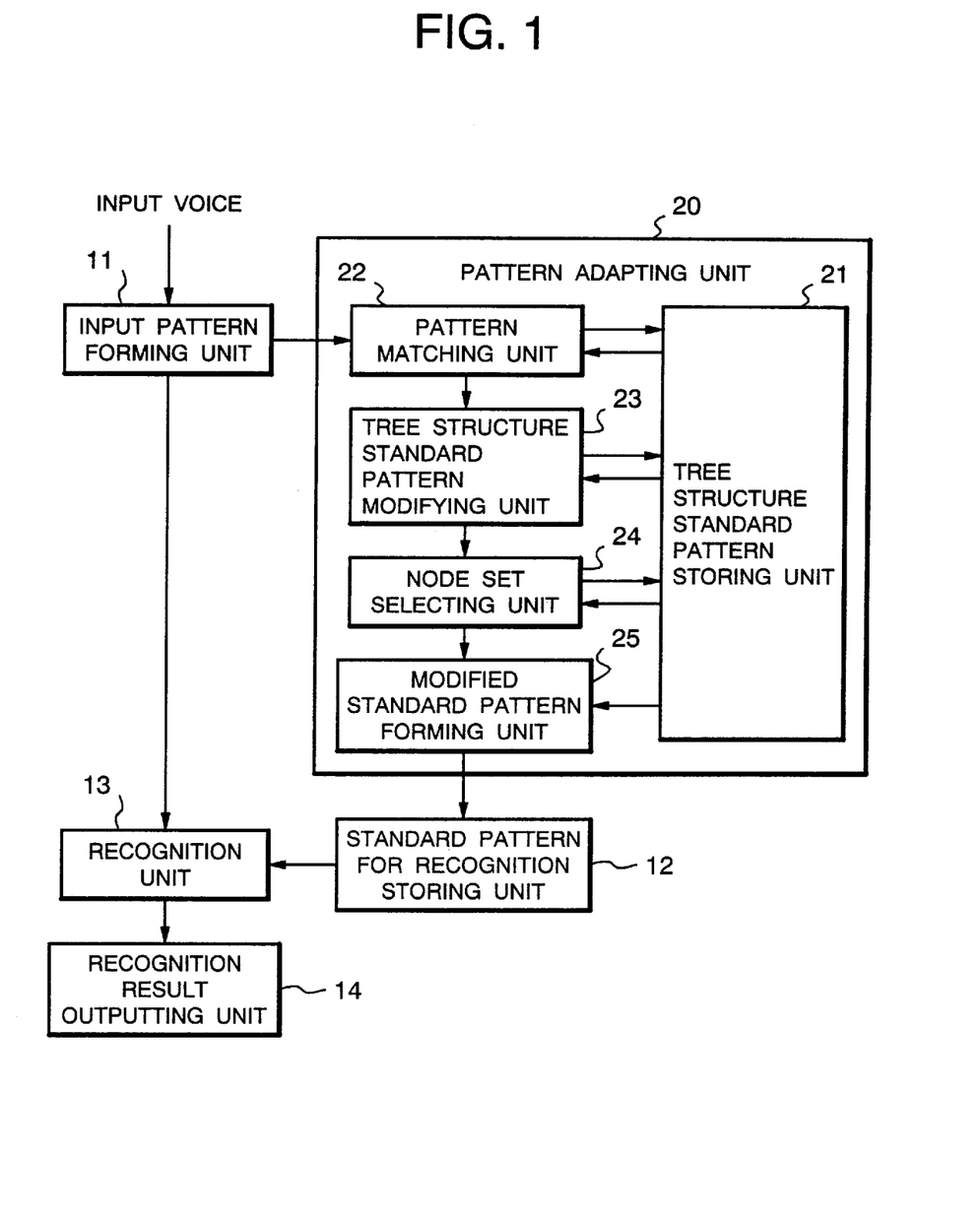
FIG. 1 is a block diagram showing an example of a structure of a voice recognition system provided with a pattern adapting apparatus according to one embodiment of the present invention.

Preferred embodiment of the present invention will be described in detail with reference to the accompanying drawings. FIG. 1 is a block diagram showing the structure of a voice recognition system provided with a pattern adapting apparatus according to one embodiment of the present invention.

In this embodiment, a word or a sentence to be sounded is indicated to a user in advance to update parameters of HMM by using word notation and an applied voice. In a sense that this adaptation has advanced knowledge of a correct word for the sound, this is categorized into adaptation with teacher. In speaker adaptation, it is necessary to minimize the amount of applied sounds required for adaptation in order to reduce a burden to a speaker. However, HMM needs a large number of parameters in general. Adaptation of all the parameters with reduced amount of sounds for adaptation therefore might result in degrading estimation accuracy of the parameters because of a data shortage and accordingly preventing improvement of recognition performance.

In the present embodiment, therefore, mean vectors of an output probability distribution are adapted out of the parameters of HMM. Selecting mean vectors for adaptation is based on the fact that they are regarded as having the greatest effects on recognition performance among the parameters of HMM.

As shown in FIG. 1, a pattern adapting apparatus 20 of the present embodiment constitutes a part of a voice recognition system. The voice recognition system includes an input pattern forming unit 11 for receiving input of sounds of a speaker to form an input pattern, a standard pattern for recognition storing unit 12 for storing a standard pattern for voice recognition, a recognition unit 13 for executing voice recognition processing based on an input pattern formed by the input pattern forming unit 11 and a standard pattern stored in standard pattern for recognition storing unit 12, a recognition result outputting unit 14 for outputting recognition results obtained by the recognition unit 13, and a pattern adapting apparatus 20 for forming a standard pattern to be stored in the standard pattern for recognition storing unit 12 based on an input pattern formed by the input pattern forming unit 11.

Of the above-described structure, the input pattern forming unit 11, the standard pattern for recognition storing unit 12, the recognition unit 13 and the recognition result outputting unit 14 have the same functions as those used in a conventional voice recognition system.

The pattern adapting apparatus 20 includes a tree structure standard pattern storing unit 21 for storing a tree structure standard pattern, a pattern matching unit 22 for conducting pattern matching of an input pattern formed by the input pattern forming unit 11 by using a standard pattern stored in the tree structure standard pattern storing unit 21, a tree structure standard pattern modifying unit 23 for modifying a tree structure standard pattern based on the results of pattern matching, a node set selecting unit 24 for selecting a set of nodes based on a modified value of a tree structure standard pattern according to the minimum description length criterion, and a modified standard pattern forming unit 25 for modifying a standard pattern by using a parameter of each node in a node set based on selection results of the node set selecting unit 24. In this figure, illustration is made only of a characteristic part of the structure of this embodiment but not of the other part.

Operation of the pattern adapting apparatus of the present invention will be described in detail.

Preparations set forth in the following are made as initial conditions.

First, initial HMM is prepared. Used as an initial HMM is, for example, a phoneme HMM of a speaker-independent formed by sounds of numbers of speakers in advance. Then, a tree structure standard pattern is made out of the initial HMM. Here, assuming a set covering all the states of a Gaussian distribution of the state of the initial HMM, a N-staged tree structure of the Gaussian distribution is created.

Figure 2:
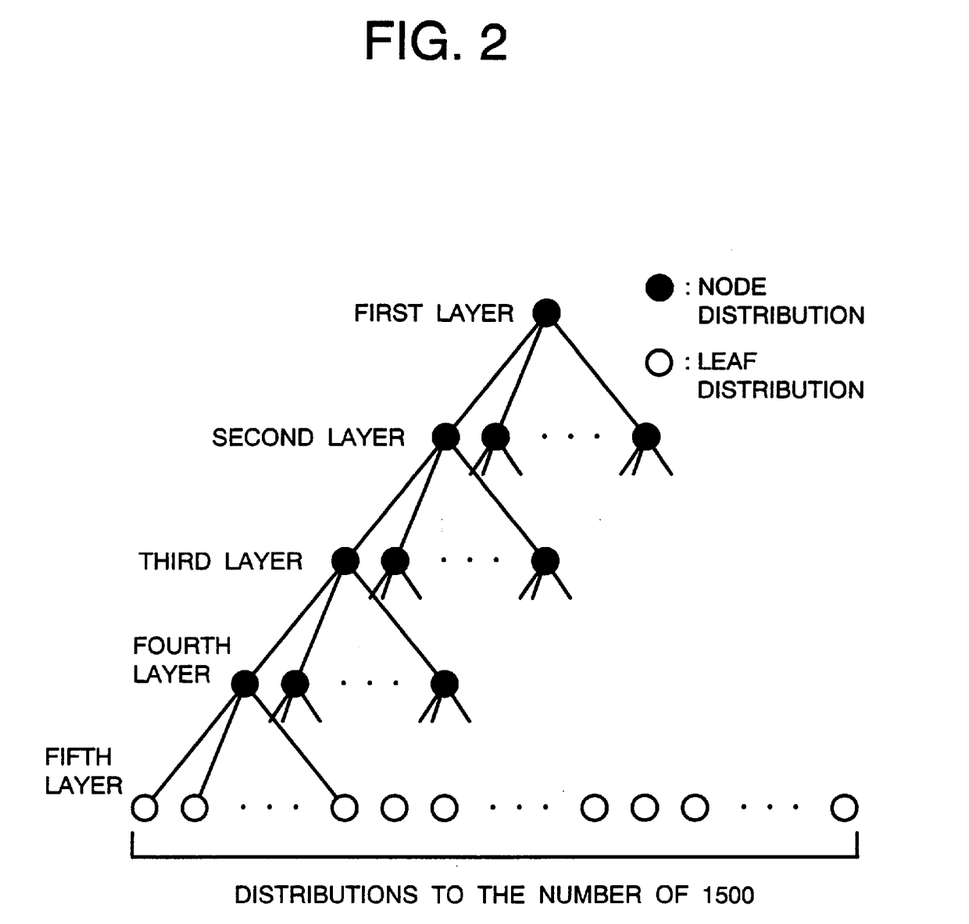
FIG. 2 is a diagram showing an example of an arrangement of a tree structure of a Gaussian distribution.

How a tree structure of a Gaussian distribution is created is recited in detail in Patent Laying-Open No. 6348292, entitled "Voice Recognition System" (hereinafter referred to as Literature 2). An example of a tree structure is shown in FIG. 2. In this example, a total number of distributions is 1,500 and N=5.

Here, nodes at the lowest stage (N-th stage) have one-on-one correspondence with the distribution at the respective states of HMM. Now, each node of the tree structure will be denoted as (n,m), where n represents a layer (n-th) in the tree structure and m represents the number of the distributions at the n-th stage. A difference vector $\Delta$ (n,m) is defined as a difference at the node (n,m) between a mean vector $\mu$ before the execution of adaptation and a mean vector estimated based on data. Variance cy (n,m) of the difference is also defined. These two quantities are parameters at each node. The initial HMM, tree structure and parameters accompanying the respective nodes are stored in the tree structure standard pattern storing unit 21.

Then, buffers A(n,m) and B(n,m) having the dimension of a feature vector and a one-dimensional buffer C(n,m) are prepared for each node of the tree structure. A is a work buffer for storing information for calculating a difference vector of a node, B is a work buffer for storing information for calculating variance of a difference vector of a node and C is a work buffer for adding, to a node, the number of its corresponding data samples. These buffers are also held in the tree structure standard pattern storing unit 21.

After the foregoing preparation is made, the following processing will be conducted for each sound applied.

First, the input pattern forming unit 11 forms an input pattern from an applied sound and sends the pattern to the pattern matching unit 21 of the pattern adapting apparatus 20 to modify a standard pattern.

The pattern matching unit 22 executes pattern matching of an input pattern to update a work buffer according to the matching results. At first, using the correct word notation, the unit 22 creates a word HMM corresponding to the input pattern by connecting initial Hmm of each phoneme, and then conducts pattern matching between the input pattern and the word HMM. In place of the expressions (2), (3) and (6), the following recurrence formulas will be employed.

$$\phi(i, O) = \pi_i, i = 1, \ldots, I \quad (8)$$

$$\phi(i, t) = \max_j \phi(j, t-1) a_{j,i} b_i(x_t) \quad (9)$$

$$i = 1, \cdots, I; = 1, \cdots, T$$

$$b_i(x_t) = \max_m \lambda_m b_{im}(x_t) \quad (10)$$

$$i = 1, \cdots, i; t = 1, \cdots, T; m = 1, \cdots, M$$

$$P_n(X) = \phi(I, T) \quad (11)$$

Method using these recurrence formulas is called Viterbi Algorithm. In these formulas, M represents the number of distributions at each state, while $b_{im}(x_1)$ represents the probability $N(x_i; \mu_{im}; \Sigma_{im})$ of occurrence of the m-th leaf distribution at the state i. Distribution is numbered so as not to overlap with each other over the whole state. Then, along with the formula (9), operation of the following expressions (12) and (13) will be performed to store the state at a time precedent to each state at each time at an array $\psi_1$, and the distribution number that will provide the highest occurrence probability at an array $\psi_2$.

$$\psi_1(i, t) = \mathrm{argmax}_j \phi(j, t-1) a_{j,i} b_i(X_t) i = 1, \ldots, I; t = 1, \ldots, T \quad (12)$$

$$\psi_2(i, t) = \mathrm{argmax}_m \lambda_m b_{im}(X_t) i = 1, \ldots, I; t = 1, \ldots, T \quad (13)$$

After the calculation of the final frame T according to the expression (11) is completed, distribution corresponding to each frame, from the final frame to the initial frame, will be sequentially obtained by using the arrays $\psi_1$, and $\psi_2$. More specifically, with the state number corresponding to the frame t denoted as S(t) and the number of a leaf distribution denoted as R(t), it can be shown as follows.

$$S(T) = 1 \quad (14)$$

$$S(T) = \psi_1(S(t+1), t+1) t = 1, \ldots, T-1 \quad (15)$$

$$R(T) = \psi_2(R(t), t) t = 1, \ldots, T-1 \quad (16)$$

This processing is referred to as back track. As a result of the processing, distribution corresponding to a feature vector at each time is obtained.

Then, processing expressed by the following expressions (17), (18) and (19) will be conducted with respect to a feature vector xt at each time to perform addition of A, B and C buffers of a leaf node.

$$A(N, R(t)) = A(N, R(t)) + (X_t - \mu_m^n) \quad (17)$$

$$B(N, R(t)) = B(N, R(t)) + (X_t - \mu_m^n)^2 \quad (18)$$

$$C(N, R(t)) = C(N, R(t)) + 1 \quad (19)$$

Here, $\mu_m^n$ represents a mean vector of the m-th distribution at the n-th stage. Similarly, addition of A, B and C buffers of a node having a leaf node R(t) as a child node is performed.

$$A(n, m) = A(n, m) + \delta(m, j_n(R(t)))(X_t - \mu_m^n) n = 1, \ldots, N-1 \quad (20)$$

$$B(n, m) = B(n, m) + \delta(m, j_n(R(t)))(X_t - \mu_m^n)^2 n = 1, \ldots, N-1 \quad (21)$$

$$C(n, m) = C(n, m) + \delta(m, j_n(R(t))) 1 n = 1, \ldots, N-1 \quad (22)$$

Here, $j_n$ (m) represents the number of a node distribution at the n-th stage having a leaf distribution m as a child node, $$\delta(i, j) = 1 \text{ if } i = j \quad (23)$$

$$\delta(i, j) = 0 \text{ if } i \neq j \quad (24)$$

the processing given by the above expressions will be repeated as many times as the number of sounded words for adaptation. The foregoing processing is executed at the pattern matching unit 22.

Upon completion of all the sound input for adaptation, the tree structure standard pattern modifying unit 23 estimates a parameter based on a value of a work buffer to modify a tree structure standard pattern. With respect to all the nodes of the tree structure, a difference vector Δ and its variance σ are obtained. These will be calculated according to the following expression.

$$\Delta(n, m) = \frac{A(n, m)}{C(n, m)}, \sigma(n, m) = \frac{B(n, m)}{C(n, m)} \quad (25)$$

Next, in order to select a node for use in modifying a mean vector of HMM out of the respective nodes of the tree structure standard pattern, the node set selecting unit 24 selects one node among each leaf node and its parent node. A set of thus selected nodes is referred to as a node set. Minimum description length criterion is used for node selection.

Description length is defined as follows.

$$l_R^{(i)} = -\log P_{\hat{\theta}}^n(x^n) + \frac{k}{2} \log n + \log M \quad (26)$$

Here, $x^n = x_i, \ldots, x_n$ represent input time series data, $\hat{\theta}$ represents maximum likelihood estimate of a parameter for the data $x^n$, k represents a degree of a model and M represents the number of information sources. Finding of this description length is explained in detail in, for example, the literature "Mathematical Principle of Information and Coding" (T. S. Han and Kingo Kobayashi, Iwanami Shoten, Publishers (1994) pp. 211–265). Model is selected so as to have the shortest description length. The first term of the expression (26) is obtained by reversing the sign of a likelihood for data and the second term expresses a quantity equivalent to the degree of complexity of a model. The more complex a model becomes, the smaller value the first term takes and the larger value the second term does. Thus, trade-off exists between the two and a model with predetermined appropriate complexity is selected as an optimum model.

By applying the above-described minimum description length criterion, a set of nodes of a tree-structured standard pattern is selected. More specifically, assuming a normal distribution as a distribution of difference vectors at the respective nodes of a tree structure, a node set in which $1_R$ will have a minimum value for an input pattern is selected. Since the third term is constant in the expression (1) and is therefore negligible, when a predetermined node set T is selected, description length for the node set will be given by the following expression.

$$l'_R = \sum_{(n,m)\in T} C(n,m)\log\sigma(n,m)^2 + k\log N \qquad (27)$$

Here, N represents a total number of feature vectors covering all the input patterns and k represents the number of nodes in the node set T.

In selecting a set of nodes, searching combinations of all the nodes in the tree structure is not practical in terms of calculation time. Such approximate algorithms as shown below are therefore used.

1. take a route node as the node
2. calculate $1_R(1_R^P)$ of the node
3. calculate $1_R(1_R^C)$ in a case where a set of child nodes of the node are to be used
4. take a child node as the node when $1_R^P > 1_R^C$ and execute the processings 2 to 5 for each child node
5. select the node as a node for use when $1_R^P < 1_R^C$ Thus executing recurrent processing will lead to selection of a set of nodes in a tree structure.

Then, the modified standard pattern forming unit 25 calculates a mean vector of a leaf node according to the expression set forth below by using a difference vector of each node in a node set.

$$\hat{\mu} = \mu_i + \Delta(n', m') \qquad (28)$$

Here, out of parent nodes of the leaf node, $\Delta(n',m')$ represents a difference vector of a node included in a node set selected by the node set selecting unit 24. Thus modified mean vector is stored as a modified standard pattern in the standard pattern for recognition storing unit 12.

The foregoing is the description of the pattern adapting apparatus based on the minimum description length principle according to the present embodiment.

As described in the foregoing, the present embodiment employs a difference vector of mean vectors of a Gaussian distribution as an adaptation target parameter. In addition, a mean vector of a Gaussian distribution, variance, a weighting factor at a state and a difference thereof can be used as parameters for adaptation to conduct adaptation in a manner as above described. It is also possible to combine these parameters for simultaneous adaptation.

Although the present embodiment employs the method disclosed in the Literature 2 for forming a tree structure, tree structure forming method is arbitrary. It is possible to form a tree structure, for example, by using the degree of similarity between phonemes in the phonemics. The Literature 2 also recites recognition using a tree structure. When employing the method recited in the Literature 2 as a recognizing means, performance in voice recognition using a tree structure can be improved by making a tree structure used in the Literature 2 the same as that for use in the adaptation according to the present invention.

Furthermore, while in the present embodiment, standard patterns are updated after all the sound input is completed, they can be updated with ease by conducting the above described processing at each sounding (sequential adaptation).

As described in the foregoing, by employing the minimum description length criterion for the adaptation of standard patterns in a voice recognition system, the present embodiment allows the number of free parameters as adaptation targets to be automatically changed with a change in the amount of data. With a small amount of voice data for adaptation, therefore, nodes of a higher layer are selected, resulting in reducing the number of free parameters. As a result, even with a small amount of data, degradation in estimation accuracy due to a shortage of data can be minimized to obtain relatively good recognition performance.

On the other hand, with a large amount of voice data for adaptation, nodes of a lower layer are selected to increase the number of free parameters. With a sufficient amount of data, a sufficient number of free parameters meeting the amount of data are estimated, so that recognition performance can be further enhanced.

Thus, the present invention enables higher-performance adaptation irrespective of the amount of data for use in adaptation.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A pattern adapting apparatus for adapting standard patterns made up of a plurality of categories to individual targets by learning that employs an input pattern as a set of input samples, comprising:

input pattern forming means for forming an input pattern;

tree structure standard pattern storing means for storing a tree structure standard pattern including a tree structure indicative of inclusive relationships among categories and a set of parameters at each node of the tree structure;

pattern matching means for matching the categories of said tree structure standard pattern with the input samples of said input pattern;

tree structure standard pattern modifying means for modifying said tree structure standard pattern based on the results of pattern matching by said pattern matching means;

node set selecting means for calculating a description length with respect to a plurality of node sets in said tree structure pattern to select an appropriate node set according to the calculated description length;

modified standard pattern forming means for forming a modified standard pattern by using a parameter set of the node set selected by said node set selecting means; and standard pattern for recognition storing means for storing a modified standard pattern formed by said modified standard pattern forming means, wherein said pattern matching means performs pattern matching by using, as a parameter, at least one of: i) a mean vector of an output probability distribution of said standard pattern, ii) a variance of the output probability distribution of said standard pattern, and iii) a weighting factor at a state of said standard pattern.

2. The pattern adapting apparatus as set forth in claim 1, wherein a time series of frame vectors obtained by voice analysis is used as said input pattern.

3. The pattern adapting apparatus as set forth in claim 1, wherein a time series of frame vectors obtained by voice analysis is used as said input pattern, and a tree structure formed by using a Gaussian distribution at each state of a Hidden Markov Model whose output probability distribution is a mixed Gaussian distribution is used as said tree structure standard pattern.

4. A pattern adapting apparatus for performing pattern recognition processing of an input voice as an input sample to specify a speaker of the input voice, comprising:

tree structure standard pattern storing means for storing a tree structure standard pattern including a tree structure indicative of inclusive relationships among categories and a set of parameters at each node of the tree structure;

pattern matching means for receiving an input pattern as a time series of frame vectors obtained by analyzing said input voice to match the categories of said tree structure standard pattern with an input sample of said input pattern;

standard pattern modifying means for modifying said tree structure standard pattern based on the results of pattern matching by said pattern matching means;

node set selecting means for calculating a description length with respect to a plurality of node sets in said tree structure pattern to select an appropriate node set according to the calculated description length;

modified standard pattern forming means for forming a modified standard pattern by using a parameter set of the node set selected by said node set selecting means; and standard pattern for recognition storing means for storing a modified standard pattern formed by said modified standard pattern forming means, wherein said pattern matching means performs pattern matching by using, as a parameter, at least one of: i) a mean vector of an output probability distribution of said standard pattern, ii) a variance of the output probability distribution of said standard pattern, and iii) a weighting factor at a state of said standard pattern.

5. The pattern adapting apparatus as set forth in claim 4, wherein a tree structure formed by using a Gaussian distribution at each state of a Hidden Markov Model whose output probability distribution is a mixed Gaussian distribution is used as said tree structure standard pattern.

6. A pattern adapting apparatus for performing pattern recognition processing of an input voice as an input sample to specify a speaker of the input voice, comprising:

tree structure standard pattern storing means for storing a tree structure standard pattern including a tree structure indicative of inclusive relationships among categories and a set of parameters at each node of the tree structure;

pattern matching means for receiving an input pattern as a time series of frame vectors obtained by analyzing said input voice to match the categories of said tree structure standard pattern with an input sample of said input pattern;

standard pattern modifying means for modifying said tree structure standard pattern based on the results of pattern matching by said pattern matching means;

node set selecting means for calculating a description length with respect to a plurality of node sets in said tree structure pattern to select an appropriate node set according to the calculated description length;

modified standard pattern forming means for forming a modified standard pattern by using a parameter set of the node set selected by said node set selecting means; and standard pattern for recognition storing means for storing a modified standard pattern formed by said modified standard pattern forming means, wherein a tree structure formed by using a Gaussian distribution at each state of a Hidden Markov Model whose output probability distribution is a mixed Gaussian distribution is used as said tree structure standard pattern, and wherein said pattern matching means performs pattern matching by using a mean vector of said output probability distribution as a parameter.

7. A voice recognition system for specifying a speaker of an input voice as an input sample by performing pattern recognition processing of the input voice, including input pattern forming means for forming an input pattern as a time series of frame vectors obtained by analyzing an input voice, standard pattern storing means for storing a model of voice information source, recognition means for recognizing an input pattern based on said input pattern and said standard pattern storing means to specify a speaker of said input voice, and a pattern adapting apparatus for modifying, for an individual speaker, said model of voice information source stored in said standard pattern storing means, said pattern adapting apparatus comprising:

tree structure standard pattern storing means for storing a tree structure standard pattern including a tree structure indicative of inclusive relationships among categories and a set of parameters at each node of the tree structure;

pattern matching means for receiving an input pattern as a time series of frame vectors obtained by analyzing said input voice to match the categories of said tree structure standard pattern with an input sample of said input pattern;

standard pattern modifying means for modifying said tree structure standard pattern based on the results of pattern matching by said pattern matching means;

node set selecting means for calculating a description length with respect to a plurality of node sets in said tree structure pattern to select an appropriate node set according to the calculated description length; and modified standard pattern forming means for forming a modified standard pattern by using a parameter set of the node set selected by said node set selecting means to store the modified standard pattern in said standard pattern storing means in place of a model of voice information source prior to the modification, wherein said pattern matching means performs pattern matching by using, as a parameter, at least one of: i) a mean vector of an output probability distribution of said standard pattern, ii) a variance of the output probability distribution of said standard pattern, and iii) a weighting factor at a state of said standard pattern.

8. The voice recognition system as set forth in claim 7, wherein said pattern adapting apparatus uses, as said tree structure standard pattern, a tree structure formed by using a Gaussian distribution at each state of a Hidden Markov Model whose output probability distribution is a mixed Gaussian distribution.

9. A voice recognition system for specifying a speaker of an input voice as an input sample by performing pattern recognition processing of the input voice, including input pattern forming means for forming an input pattern as a time series of frame vectors obtained by analyzing an input voice, standard pattern storing means for storing a model of voice information source, recognition means for recognizing an input pattern based on said input pattern and said standard pattern storing means to specify a speaker of said input voice, and a pattern adapting apparatus for modifying, for an individual speaker, said model of voice information source stored in said standard pattern storing means, said pattern adapting apparatus comprising:

tree structure standard pattern storing means for storing a tree structure standard pattern including a tree structure indicative of inclusive relationships among categories and a set of parameters at each node of the tree structure;

pattern matching means for receiving an input pattern as a time series of frame vectors obtained by analyzing said input voice to match the categories of said tree structure standard pattern with an input sample of said input pattern;

standard pattern modifying means for modifying said tree structure standard pattern based on the results of pattern matching by said pattern matching means;

node set selecting means for calculating a description length with respect to a plurality of node sets in said tree structure pattern to select an appropriate node set according to the calculated description length; and     modified standard pattern forming means for forming a modified standard pattern by using a parameter set of the node set selected by said node set selecting means to store the modified standard pattern in said standard pattern storing means in place of a model of voice information source prior to the modification,     wherein said pattern adapting apparatus uses, as said tree structure standard pattern, a tree structure formed by using a Gaussian distribution at each state of a Hidden Markov Model whose output probability distribution is a mixed Gaussian distribution, and     wherein said pattern matching means of said pattern adapting apparatus performs pattern matching by using a mean vector of said output probability distribution as a parameter.

10. A pattern adapting apparatus for adapting standard patterns made up of a plurality of categories to individual targets by learning that employs an input pattern as a set of input samples, comprising:

input pattern forming means for forming an input pattern;

candidate standard pattern storing means for storing a plurality of standard patterns;

pattern matching means for matching the categories of said standard pattern with the input samples of said input pattern;

standard pattern modifying means for modifying said standard pattern based on the results of pattern matching by said pattern matching means;

description length calculating means for calculating a description length of said each modified standard pattern corresponding to said input pattern;

modified standard pattern selecting means for selecting a modified standard pattern according to a description length of said standard pattern calculated by said description length calculating means; and     standard pattern for recognition storing means for storing a modified standard pattern formed by said modified standard pattern selecting means,     wherein said pattern matching means performs pattern matching by using, as a parameter, at least one of: i) a mean vector of an output probability distribution of said standard pattern, ii) a variance of the output probability distribution of said standard pattern, and iii) a weighting factor at a state of said standard pattern.

11. The pattern adapting apparatus as set forth in claim 10, wherein a time series of frame vectors obtained by voice analysis is used as said input pattern, and     a Hidden Markov Model whose output probability distribution is a mixed Gaussian distribution is used as said standard pattern.

12. The pattern adapting apparatus as set forth in claim 1, wherein the modified standard pattern is determined and stored in the standard pattern for recognition storing means during a voice recognition mode to be used to recognize the input pattern.

13. The pattern adapting apparatus as set forth in claim 1, wherein the modified standard pattern is determined and stored in the standard pattern for recognition storing means at a same time that the input pattern is being recognized during a voice recognition mode.

14. The pattern adapting apparatus as set forth in claim 4, wherein the modified standard pattern is determined and stored in the standard pattern for recognition storing means during a voice recognition mode to be used to recognize the input pattern.

15. The pattern adapting apparatus as set forth in claim 4, wherein the modified standard pattern is determined and stored in the standard pattern for recognition storing means at a same time that the input pattern is being recognized during a voice recognition mode.

16. The pattern adapting apparatus as set forth in claim 7, wherein the modified standard pattern is determined and stored in the standard pattern storing means during a voice recognition mode to be used to recognize the input pattern.

17. The pattern adapting apparatus as set forth in claim 7, wherein the modified standard pattern is determined and stored in the standard pattern storing means at a same time that the input pattern is being recognized during a voice recognition mode.

18. The pattern adapting apparatus as set forth in claim 10, wherein the modified standard pattern is determined and stored in the standard pattern for recognition storing means during a voice recognition mode to be used to recognize the input pattern.

19. The pattern adapting apparatus as set forth in claim 10, wherein the modified standard pattern is determined and stored in the standard pattern for recognition storing means at a same time that the input pattern is being recognized during a voice recognition mode.

\* \* \* \* \*